United States Patent [19]

Wang

[11] Patent Number: 5,362,034
[45] Date of Patent: Nov. 8, 1994

[54] HYDRAULIC HEIGHT ADJUSTING DEVICE

[75] Inventor: John Wang, Chiayi, Taiwan, Prov. of China

[73] Assignee: Chia-Hsiung Chen, Taipei, Taiwan, Prov. of China

[21] Appl. No.: 112,706

[22] Filed: Aug. 26, 1993

[51] Int. Cl.⁵ .......................... F16F 9/44; A47B 9/10
[52] U.S. Cl. .............................. 267/64.12; 188/300
[58] Field of Search ............... 267/64.12, 64.18, 64.22, 267/64.23, 64.27, 131; 188/300, 322.18; 248/161, 576, 599, 631; 297/345, 355

[56] References Cited

U.S. PATENT DOCUMENTS

| | | | |
|---|---|---|---|
| 4,871,149 | 10/1989 | Dony et al. | 267/64.12 |
| 5,097,928 | 3/1992 | Enders et al. | 188/300 |
| 5,263,674 | 11/1993 | Huang | 267/64.12 |

*Primary Examiner*—Robert J. Oberleitner
*Assistant Examiner*—Chris Schwartz
*Attorney, Agent, or Firm*—Charles E. Wands

[57] ABSTRACT

A hydraulic height adjusting device includes a sealed upright cylinder body in which a piston is provided. A piston rod is connected to the piston at one end and extends through a lower end of the cylinder body. A first positioning member is fitted in the cylinder body adjacent to an upper end of the latter. A second positioning member has an axial hole formed therein and is fitted in the cylinder body between the first positioning member and the piston. A hollow tube has a radial hole formed through a wall portion thereof and extends axially in the cylinder body between the first and second positioning members. The piston and the first and second positioning members cooperatively partition the cylinder body into a first oil chamber filled with hydraulic oil, a second oil chamber filled with hydraulic oil and communicated with the first oil chamber by an oil passage formed in the piston, and a receiving chamber receiving compressible nitrogen therein and communicated with the second oil chamber by the axial hole and the radial hole. A movable shaft extends axially into the tube and has a lowermost end which extends into the second oil chamber and which is provided with a valve piece that is biased to selectively block or unblock the axial hole.

5 Claims, 6 Drawing Sheets

HYDRAULIC HEIGHT ADJUSTING DEVICE

BACKGROUND OF THE INVENTION

1. Field Of The Invention

This invention relates to a hydraulic height adjusting device, more particularly to a height adjusting device which is simple in construction and which is easier to manufacture than the prior art.

2. Description Of The Related Art

Referring to FIG. 1, a conventional height adjusting device 1 includes an inner cylinder 11 and an outer cylinder 12. Stoppers, 13 and 14, plug both ends of the outer cylinder 12 and the inner cylinder 11 which is disposed inside the outer cylinder 12. A clearance 121 is left between the outer and inner cylinders, 11 and 12. A helical spring 17 is disposed in the clearance 121 around the inner cylinder 11. A piston 151 is provided inside a fluid reservoir 111 confined by the inner cylinder 11. A piston shaft 15 is connected to the piston 151 and extends through the stopper 14. A slidable piston 18 is disposed in the clearance 121 between the stopper 13 and the helical spring 17. The slidable piston 18 and the stopper 13 cooperatively confine a fluid receiving space 181. The stopper 13 has a longitudinal shaft opening 132 and a pair of fluid passages 131 which communicate the fluid receiving space 181 with the fluid reservoir 111 confined by the inner cylinder 11 via the shaft opening 132. A shaft 19 has a lowermost end extending through the shaft opening 132 and into the fluid reservoir 111. A valve piece 193 is provided on the lowermost end of the shaft 19 to selectively block the shaft opening 132. The uppermost end of the shaft 19 extends through the stopper 13. A switching member 191 is provided on the uppermost end of the shaft 19. A helical spring 192 is disposed between the switching member 191 and the stopper 13, and surrounds an uppermost portion of the shaft 19. The helical spring 192 is attached to the switching member 191 at one end and is attached to the stopper 13 at the other end so as to bias the valve piece 193 to tightly block the shaft opening 132 in order to prevent fluid from flowing between the fluid reservoir 111 and the fluid receiving space 181.

When incorporating the height adjusting device 1 in a height adjustable chair, the lowermost end of the piston shaft 15 is fixed to the chair support stand (not shown). The switching member 191 should be conveniently located and is operable by means of a lever or any similar device (not shown).

To adjust the height of a chair incorporating the height adjusting device 1, the switching member 191 is actuated to move downward, thereby compressing the helical spring 192 and moving the shaft 19 downward to correspondingly remove the valve piece 193 from the shaft opening 132. The topmost end of the stopper 13 supports a load-bearing article, such as a chair seat (not shown). When downward pressure is applied to the stopper 13, the outer and inner cylinders, 12 and 11, simultaneously move downward. Since the valve piece 193 is displaced from the shaft opening 132, hydraulic fluid inside the fluid reservoir 111 is forced by the piston 151 to flow through the shaft opening 132 and the fluid passages 131 and into fluid receiving space 181. As the volume of hydraulic fluid inside the fluid receiving space 181 gradually increases, the piston 18 consequently moves downward, thereby compressing the helical spring 17.

When the switching member 191 is released, the helical spring 192 expands, thereby moving the valve piece 193 to once more block the shaft opening 132. Further downward movement of the outer and inner cylinders, 12 and 11, is stopped, thereby maintaining the chair seat at the desired height.

When the applied downward pressure on the stopper 13 is less than the biasing force of the helical spring 17, and the valve piece 193 is in an open position, the helical spring 17 gradually expands to return the stopper 13 and the outer and inner cylinders, 12 and 11, to the initial unadjusted positions.

The drawback of the above-described conventional height adjusting device 1 is that the axes of the inner cylinder 11, the outer cylinder 12 and the piston shaft 15, must be precisely aligned to ensure proper operation of the device 1. Such precise alignment cannot be achieved conveniently, thereby complicating the manufacturing process of the same.

SUMMARY OF THE INVENTION

Therefore, the main object of the present invention is to provide a hydraulic height adjusting device which is simple in construction and which is easier to manufacture than the prior art.

According to the present invention, a hydraulic height adjusting device includes a sealed upright cylinder body, a piston, a stationary piston rod, a hollow tube, a movable shaft, a valve piece, a biasing means and an actuating means. The cylinder body has an upper end and a lower end. The piston is provided inside the cylinder body. The lower end of the cylinder body and the piston cooperatively confine a first volume-variable oil chamber that is filled with hydraulic oil. The stationary piston rod has a first end that is connected securely to the piston and a second end that extends through the lower end of the cylinder body. The cylinder body is movable vertically relative to the stationary piston rod. The first positioning member is fitted in the cylinder body adjacent to the upper end of the cylinder body. The second positioning member has an axial hole that is formed therein and is fitted in the cylinder body between the first positioning member and the piston. The piston and the second positioning member cooperatively confine a second volume-variable oil chamber that is filled with hydraulic oil. The first and second positioning members cooperatively confine a receiving chamber that receives a compressible means therein. The piston has an oil passage that is formed therethrough so as to communicate the first and second oil chambers. The hollow tube extends axially in the receiving chamber and has an upper end that is connected securely to the first positioning member, and a lower end that is connected securely to the second positioning member. The tube is formed with a radial hole adjacent to the lower end thereof. The axial hole in the second positioning member and the radial hole in the tube intercommunicate the second oil chamber and the receiving chamber. The movable shaft extends axially into the hollow tube and has an uppermost end and a lowermost end that extends into the second oil chamber. The movable shaft defines a clearance with an inner wall surface of the tube. The valve piece is provided on the lowermost end of the shaft to selectively block the axial hole in the second positioning member so as to prevent vertical movement of the cylinder body relative to the piston rod. The biasing means serves to bias the valve piece to block normally the axial hole. The actuating means is provided on the uppermost end of the movable shaft and is operable so as to move the movable shaft downward against action of the biasing means to correspondingly remove the valve piece from the axial hole in order to permit vertical movement of the cylinder body relative to the piston rod.

In another aspect of the present invention, a hydraulic height adjusting device includes a sealed upright cylinder body having an upper end and a lower end. A piston is provided inside the cylinder body. The lower end of the cylinder body and the piston cooperatively confine a first volume-variable oil chamber that is filled with hydraulic oil. The piston rod has a first end that is connected securely to the piston and a second end that extends through the lower end of the cylinder body. The cylinder body is movable vertically relative to the stationary piston rod. A first positioning member is fitted in the cylinder body adjacent to the upper end of the cylinder body. A second positioning member has an axial hole that is formed therein and is fitted in the cylinder body between the first positioning member and the piston. The piston and the second positioning member cooperatively confine a second volume-variable oil chamber that is filled with hydraulic oil. The first and second positioning members cooperatively confine a receiving chamber that is filled with compressible nitrogen. The piston has an oil passage that is formed therethrough so as to communicate the first and second oil chambers. A hollow tube extends axially in the receiving chamber and has an upper end that is connected securely to the first positioning member, and a lower end that is connected securely to the second positioning member. The tube is formed with a radial hole adjacent to the lower end thereof. A flexible sleeve member surrounds an outer surface of the hollow tube so as to form a volume-variable oil receiving room therebetween. The axial hole in the second positioning member and the radial hole in the tube intercommunicate the second oil chamber and the receiving room. A movable shaft extends axially into the hollow tube and has an uppermost end and a lowermost end that extends into the second oil chamber. The movable shaft defines a clearance with an inner wall surface of the tube. A valve piece is provided on the lowermost end of the shaft to selectively block the axial hole in the second positioning member so as to prevent vertical movement of the cylinder body relative to the piston rod. A biasing means serves to bias the valve piece to block normally the axial hole. An actuating means is provided on the uppermost end of the movable shaft and is operable so as to move the movable shaft downward against action of the biasing means to correspondingly remove the valve piece from the axial hole in order to permit vertical movement of the cylinder body relative to the piston rod.

In still another aspect of the present invention. a hydraulic height adjusting device includes a sealed upright cylinder body having an upper end and a lower end. A piston is provided inside the cylinder body. The lower end of the cylinder body and the piston cooperatively confine a first volume-variable oil chamber that is filled with hydraulic oil. A piston rod has a first end that is connected securely to the piston and a second end that extends through the lower end of the cylinder body. The cylinder body is movable vertically relative to the stationary piston rod. A first positioning member is fitted in the cylinder body adjacent to the upper end of the cylinder body. A second positioning member has an axial hole that is formed therein and is fitted in the cylinder body between the first positioning member and the piston. The piston and the second positioning member cooperatively confine a second volume-variable oil chamber that is filled with hydraulic oil. The first and second positioning members cooperatively confine a third oil chamber that is filled with hydraulic oil. The piston has an oil passage formed therethrough so as to communicate the first and second oil chambers. A hollow tube extends axially in the third oil chamber and has an upper end that is connected securely to the first positioning member, and a lower end that is connected securely to the second positioning member. The tube is formed with a radial hole adjacent to the lower end thereof. A flexible sleeve member surrounds an outer surface of the hollow tube so as to form a volume-variable receiving room that is filled with compressible nitrogen. The axial hole in the second positioning member and the radial hole in the tube intercommunicate the second oil chamber and the receiving room. A movable shaft extends axially into the hollow tube and has an uppermost end and a lowermost end that extends into the second oil chamber. The movable shaft defines a clearance with an inner wall surface of the tube. A valve piece is provided on the lowermost end of the shaft to selectively block the axial hole in the second positioning member so as to prevent vertical movement of the cylinder body relative to the piston rod. A biasing means serves to bias the valve piece to block normally the axial hole. An actuating means is provided on the uppermost end of the movable shaft and is operable so as to move the movable shaft downward against action of the biasing means to correspondingly remove the valve piece from the axial hole in order to permit vertical movement of the cylinder body relative to the piston rod.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENT

Figure 1:
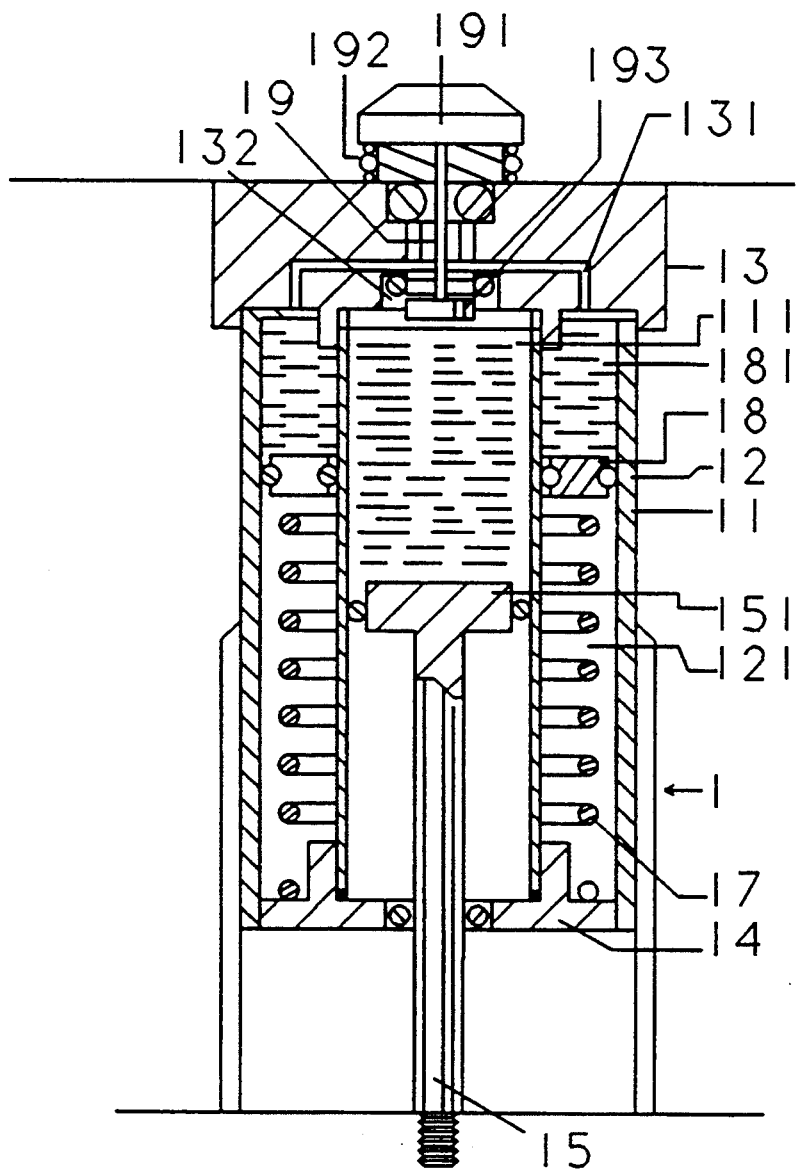
FIG. 1 is a sectional view of a conventional height adjusting device.
Figure 2:
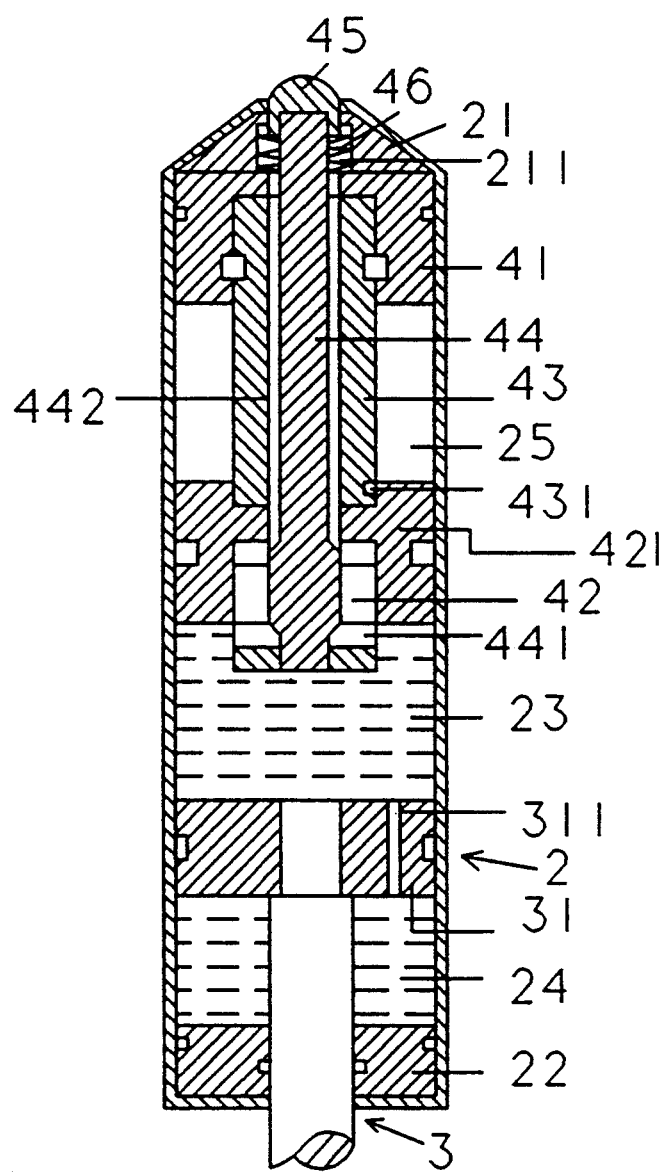
FIG. 2 is a sectional view of a hydraulic height adjusting device according to a first embodiment of the present invention.

Referring to FIG. 2, a hydraulic height adjusting device according to a first embodiment of the present invention includes a sealed upright cylinder body 2 which is sealed at two ends by sealing members, 21 and 22, respectively. The sealing member 21 has a recess 211 formed therein. A piston 31 is provided inside the cylinder body 2. The piston 31 and the sealing member 22, which seals the lower end of the cylinder body 2, cooperatively confine a first volume-variable oil chamber 24 that is filled with hydraulic oil. A stationary piston rod 3 has a first end that is connected securely to the piston 31 and a second end that extends through the sealing member 22 and the lower end of the cylinder body 2. The cylinder body 2 is movable vertically relative to the stationary piston rod 3. A first positioning member 41 is fitted in the cylinder body 2 adjacent to the sealing member 21 which seals the upper end of the cylinder body 2. A second positioning member 42 has an axial hole 421 formed therein and is fitted in the cylinder body 2 between the first positioning member 41 and the piston 31. The piston 31 and the second positioning member 42 cooperatively confine a second volume-variable oil chamber 23 that is filled with hydraulic oil. The first and second positioning members, 41 and 42, cooperatively confine a receiving chamber 25 that receives a compressible means therein. In the present embodiment, the compressible means is preferably compressible nitrogen. The piston 31 has an oil passage 311 formed therethrough so as to communicate the first and second oil chambers, 24 and 23.

A hollow tube 43 extends axially in the receiving chamber 25 and has an upper end that is connected securely to the first positioning member 41. The tube 43 further has a lower end that is connected securely to the second positioning member 42 and is formed with a radial hole 431 adjacent to the lower end thereof. The axial hole 421 in the second positioning member 42 and the radial hole 431 in the tube 43 intercommunicate the second oil chamber 23 and the receiving chamber 25. A movable shaft 44 extends axially into the hollow tube 43 and has an uppermost end and a lowermost end that extends into the second oil chamber 23. The movable shaft 44 defines a clearance 442 with an inner wall surface of the tube 43. A valve piece is provided on the lowermost end of the shaft 44 to selectively block the axial hole 421 in the second positioning member 42 so as to prevent vertical movement of the cylinder body 2 relative to the piston rod 3. A biasing means, which is preferably a helical spring 46, is disposed on the recess 211 and surrounds an uppermost end portion of the movable shaft 44. An actuating means, which is shown as a pressing button 45, is provided on the uppermost end of the movable shaft 44. One end of the helical spring 46 is attached to the top surface of the first positioning member 41, while the other end of the helical spring 46 is attached to the pressing button 45. The pressing button 45 is conveniently located and is operable by means of a lever or any similar device (not shown) so as to move the movable shaft 44 downward against action of the helical spring 46 to correspondingly remove the valve piece 441 from the axial hole 421 in order to permit vertical movement of the cylinder body 2 relative to the piston rod 3.

When incorporating the hydraulic height adjusting device according to the present invention in a height adjustable chair, the lowermost end of the piston rod 3 is fixed to the chair support stand (not shown), while the upper end of the cylinder body 2 supports the chair seat (not shown). Referring once more to FIG. 2, the height of the chair incorporating the adjusting device is maintained when the helical spring 46 is in a fully expanded position, wherein the valve piece 441 blocks the axial hole 421 tightly, thereby preventing hydraulic oil from flowing between the second oil chamber 23 and the receiving chamber 25.

Figure 3:
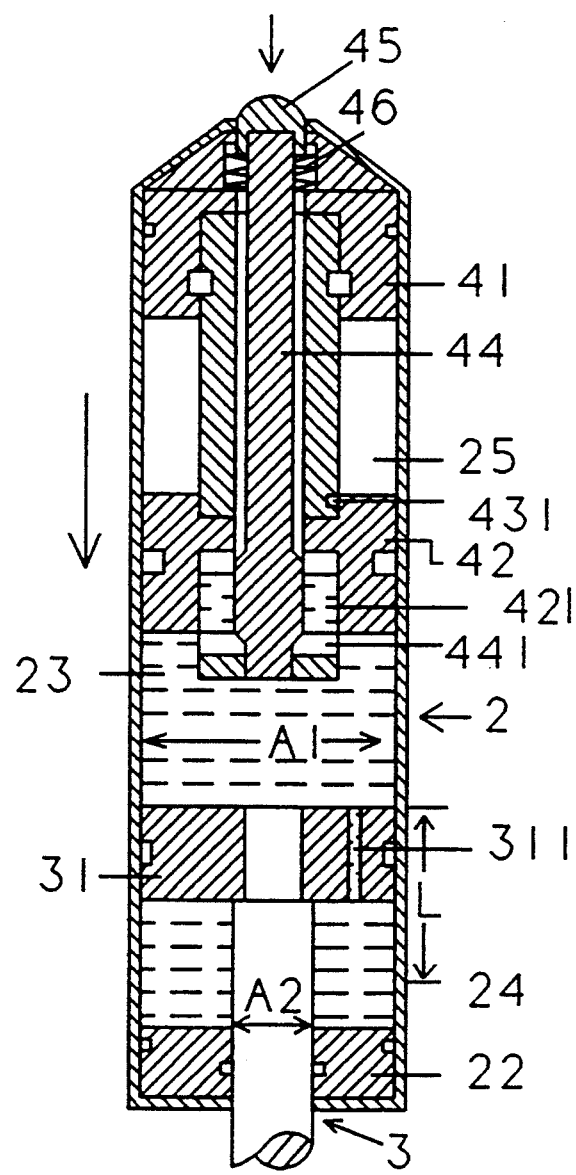
FIG. 3 illustrates the operation of the hydraulic height adjusting device in FIG. 2.

Referring now to FIG. 3, to reduce the height of the chair, the pressing button 46 is actuated to move the movable shaft 44 downward to correspondingly move the valve piece 441 away from the axial hole 421. Downward pressure that is applied to the upper end of the cylinder body 2 via the chair seat (not shown) by a user (not shown) or a load-bearing article (not shown) forces the cylinder body 2 to simultaneously move downward. At this state, the volume of the second oil chamber 23 is reduced but the volume of the first oil chamber 24 is increased. The hydraulic oil in the second oil chamber 23 flows partially into the first oil chamber 24 via the oil passage 311 in the piston 31. For example, supposing that the cross sectional area of the cylinder body 2 is (A1) and the cross sectional area of the piston rod 3 is (A2), when the cylinder body 2 travels a distance (L) relative to the piston rod 3, the total volume of the hydraulic oil that should flow out of the second oil chamber 23 is (A1*L). However, the volume of the first oil chamber 24 increases by only ((A1-A2)*L). Therefore, an excess volume (A2*L) of the hydraulic oil flows out of the second oil chamber 23 and into the receiving chamber 25 via the axial hole 421, the clearance 442 and the radial hole 431 so as to compress the compressible nitrogen in the receiving chamber 25. When the pressing button 45 is released, the helical spring 46 expands, thereby moving the valve piece 441 to once more block the axial hole 421.

Alternatively, to increase the height of the chair, the pressing button 45 is actuated to move the shaft 44 downward to correspondingly move the valve piece 441 away from the axial hole 421. No downward pressure is applied on the cylinder body 2, and thus, the hydraulic oil in the receiving chamber 25 is forced to flow back into the second oil chamber 23 under the presence of pressure which is provided by the compressible nitrogen in the receiving chamber 25. Under such circumstances, the cylinder body 2 moves upward relative to the piston rod 3 until the axial hole 421 is blocked again or until an equilibrium state is reached.

Figure 4:
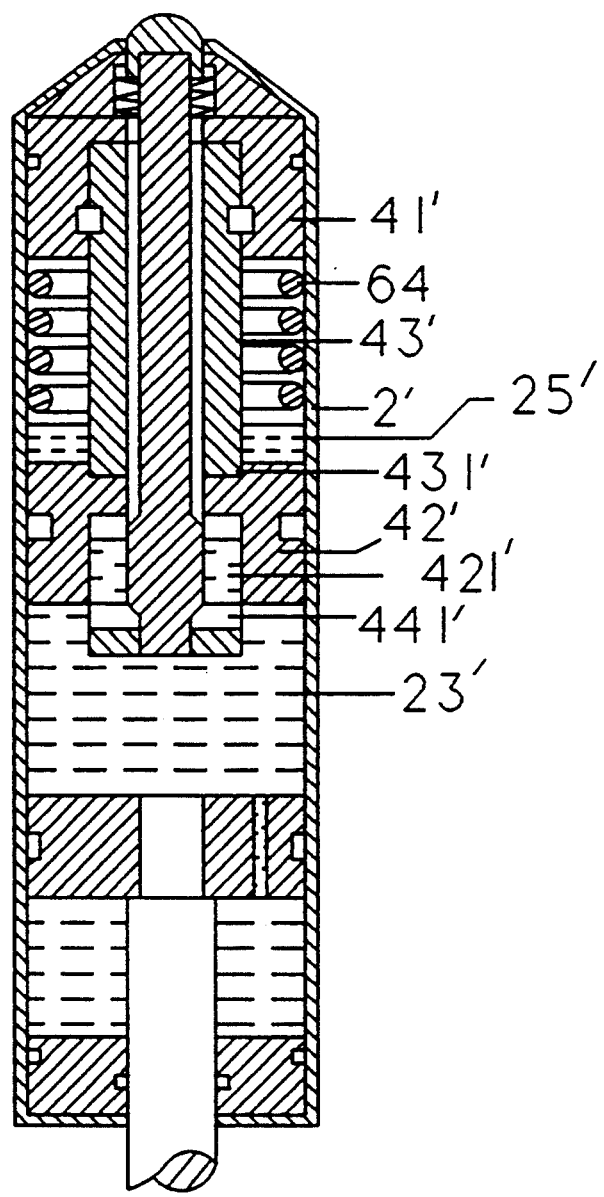
FIG. 4 is a sectional view showing a hydraulic height adjusting device according to a second embodiment of the present invention.

FIG. 4 illustrates a second embodiment of the present invention. Unlike the first embodiment, the biasing means includes a slidable piston 63 which is disposed in the receiving chamber 25' and which confines cooperatively a locating space with the first positioning member 41', and a helical compression spring 64 which is disposed in the locating space and which surrounds the hollow tube 43'. One end of the helical compression spring 64 is attached to the first positioning member 41', while the other end of the spring 64 is attached to the slidable piston 63. Therefore, the slidable piston 63 is forced to move toward the first positioning member 41' to compress the helical compression spring 64 when the valve piece 441' unblocks the axial hole 421' and a downward pressure is applied on the cylinder body 2' to force the hydraulic oil in the second oil chamber 23' to flow into the receiving chamber 25' via the axial hole 421' in the second positioning member 42', the clearance in the tube 43', and the radial hole 431' in the tube 43'. When the valve piece 441' unblocks the axial hole 421' and no downward pressure is applied on the cylinder body 2', the helical compression spring 64 gradually expands to move the slidable piston 63 toward the second positioning member 42' so as to force the hydraulic oil in the receiving chamber 25' to flow back into the second oil chamber 23'.

Figure 5:
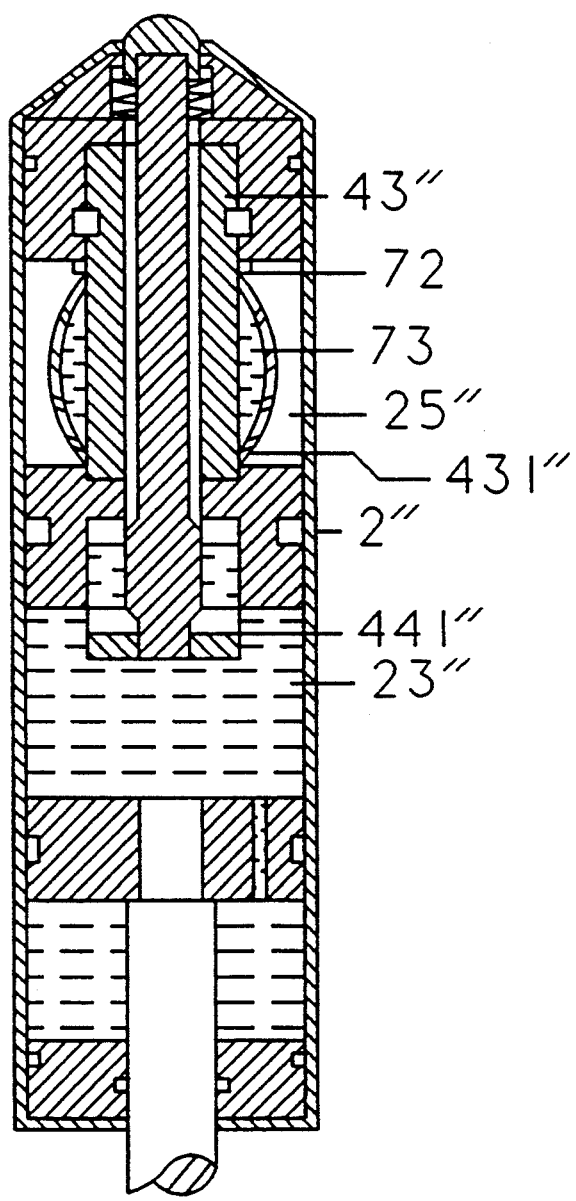
FIG. 5 is a sectional view of a hydraulic height adjusting device according to a third embodiment of the present invention.

Referring now to FIG. 5, a third embodiment of the present invention is shown. Unlike the first and second embodiments, the adjusting device further comprises a flexible sleeve member 73 which is disposed in the receiving chamber 25". The receiving chamber 25" is filled with compressible nitrogen. The sleeve member 73 surrounds an outer surface of the hollow tube 43" so as to form a volume-variable oil receiving room therebetween. The radial hole 431" in the tube 43" intercommunicates the oil receiving room and the second oil chamber 23". Two annular sealing elements 72 respectively seal the two edges of the sleeve member 73 to the outer surface of the hollow tube 43". When the valve piece 441" unblocks the axial hole 421" and a downward pressure is applied on the cylinder body 2", the hydraulic oil in the second oil chamber 23" is forced to flow partially into the oil receiving room. The sleeve member 73 expands so as to compress the compressible nitrogen in the receiving chamber 25". When the valve piece 441" unblocks the axial hole 421" and no downward pressure is applied on the cylinder body 2", the hydraulic oil in the oil receiving room is expelled from the latter so as to flow back into the second oil chamber 23" under the presence of pressure which is provided by the compressible nitrogen in the receiving chamber 25".

Figure 6:
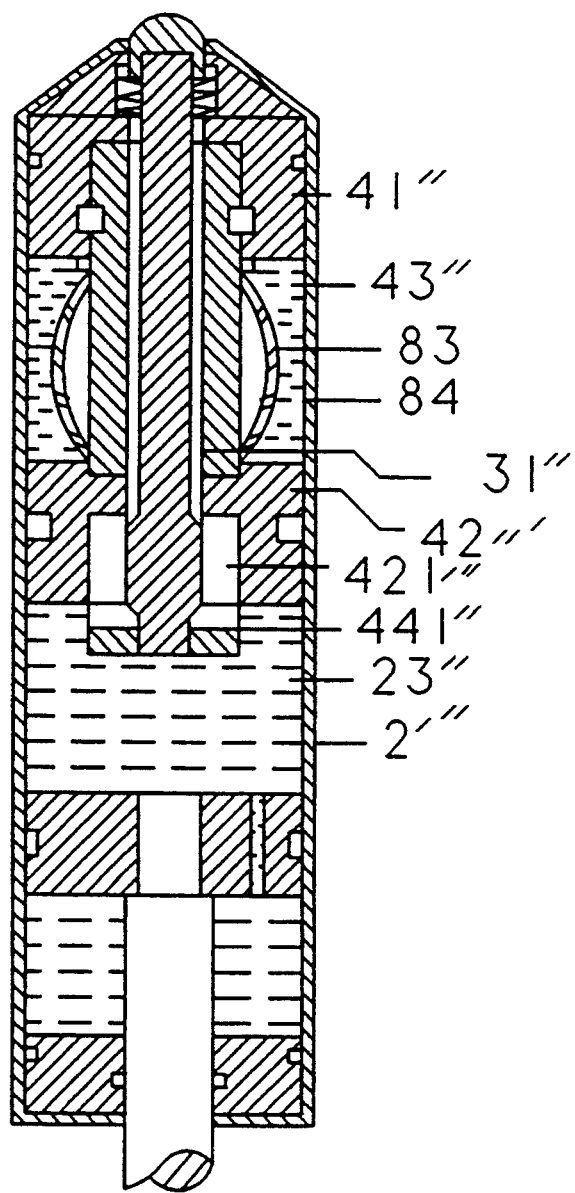
FIG. 6 is a sectional view showing a hydraulic height adjusting device according to a fourth embodiment of the present invention.

A fourth embodiment of the present invention is shown in FIG. 6. Unlike the aforementioned embodiments, a flexible sleeve member 83 is disposed in a third oil chamber 84 which is confined by the first and second positioning members 41''' and 42''' and which is filled with hydraulic oil. The sleeve member 83 surrounds an outer surface of the hollow tube 43''' so as to form a volume-variable receiving room that is filled with compressible nitrogen. A radial hole 431''' in the hollow tube 43''' and the axial hole 421''' in the second positioning member 42''' intercommunicate the second and third oil chambers 23''' and 84. When the valve piece 441''' unblocks the axial hole 421''' and a downward pressure is applied on the cylinder body 2''', the hydraulic oil in the second oil chamber 23''' is forced to flow into the third oil chamber 84 via the axial hole 421''' and the radial hole 431''', thereby compressing the compressible nitrogen in the receiving room. When the valve piece 441''' unblocks the axial hole 421''' and no downward pressure is applied on the cylinder body 2''', the hydraulic oil in the third oil chamber 84 is forced to flow back into the second oil chamber 23''' under the presence of pressure which is provided by the compressible nitrogen in the receiving room.

The advantage of using the flexible sleeve member in the third and fourth embodiments of the present invention is to prevent the compressible nitrogen from flowing into the second oil chamber 23", 23'''.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A hydraulic height adjusting device, comprising:
   a sealed upright cylinder body having an upper end and a lower end;
   a piston provided inside said cylinder body, said piston and said lower end of said cylinder body cooperatively confining a first volume-variable oil chamber that is filled with hydraulic oil;
   a stationary piston rod having a first end connected securely to said piston and a second end extending through said lower end of said cylinder body, said cylinder body being movable vertically relative to said stationary piston rod;
   a first positioning member fitted in said cylinder body adjacent to said upper end of said cylinder body;
   a second positioning member having an axial hole formed therein and being fitted in said cylinder body between said first positioning member and said piston, said piston and said second positioning member cooperatively confining a second volume-variable oil chamber that is filled with hydraulic oil, said first and second positioning members cooperatively confining a receiving chamber that receives a compressible means therein, said piston having an oil passage formed therethrough so as to communicate said first and second oil chambers;
   a hollow tube extending axially in said receiving chamber and having an upper end connected securely to said first positioning member, and a lower end connected securely to said second positioning member, said tube being formed with a radial hole adjacent to said lower end thereof, said axial hole in said second positioning member and said radial hole in said tube intercommunicating said second oil chamber and said receiving chamber;
   a movable shaft extending axially into said hollow tube and having an uppermost end and a lowermost end extending into said second oil chamber, said movable shaft defining a clearance with an inner wall surface of said tube;
   a valve piece provided on said lowermost end of said shaft to selectively block said axial hole in said second positioning member so as to prevent vertical movement of said cylinder body relative to said piston rod;
   a biasing means to bias said valve piece to block normally said axial hole; and
   an actuating means provided on said uppermost end of said movable shaft and operable so as to move said movable shaft downward against action of said biasing means to correspondingly remove said valve piece from said axial hole in order to permit vertical movement of said cylinder body relative to said piston rod.

2. A hydraulic height adjusting device as claimed in claim 1, wherein said compressible means is compressible nitrogen.

3. A hydraulic height adjusting device as claimed in claim 1, wherein said compressible means comprises a slidable piston mounted slidably on said hollow tube and a helical compression spring disposed around said hollow tube, said helical compression spring having two ends attached to said first positioning member and said slidable piston, respectively.

4. A hydraulic height adjusting device, comprising:
   a sealed upright cylinder body having an upper end and a lower end;
   a piston provided inside said cylinder body, said piston and said lower end of said cylinder body cooperatively confining a first volume-variable oil chamber that is filled with hydraulic oil;
   a stationary piston rod having a first end connected securely to said piston and a second end extending through said lower end of said cylinder body, said cylinder body being movable vertically relative to said stationary piston rod;

a first positioning member fitted in said cylinder body adjacent to said upper end of said cylinder body;

a second positioning member having an axial hole formed therein and being fitted in said cylinder body between said first positioning member and said piston, said piston and said second positioning member cooperatively confining a second volume-variable oil chamber that is filled with hydraulic oil, said first and second positioning members cooperatively confining a receiving chamber that receives compressible nitrogen therein, said piston having an oil passage formed therethrough so as to communicate said first and second oil chambers;

a hollow tube extending axially in said receiving chamber and having an upper end connected securely to said first positioning member, and a lower end connected securely to said second positioning member, said tube being formed with a radial hole adjacent to said lower end thereof;

a flexible sleeve member surrounding an outer surface of said hollow tube so as to form a volume-variable oil receiving room therebetween, said axial hole in said second positioning member and said radial hole in said tube intercommunicating said second oil chamber and said receiving room;

a movable shaft extending axially into said hollow tube and having an uppermost end and a lowermost end extending into said second oil chamber, said movable shaft defining a clearance with an inner wall surface of said tube;

a valve piece provided on said lowermost end of said shaft to selectively block said axial hole in said second positioning member so as to prevent vertical movement of said cylinder body relative to said piston rod;

a biasing means to bias said valve piece to block normally said axial hole; and an actuating means provided on said uppermost end of said movable shaft and operable so as to move said movable shaft downward against action of said biasing means to correspondingly remove said valve piece from said axial hole in order to permit vertical movement of said cylinder body relative to said piston rod.

5. A hydraulic height adjusting device, comprising:
a sealed upright cylinder body having an upper end and a lower end;
a piston provided inside said cylinder body, said piston and said lower end of said cylinder body cooperatively confining a first volume-variable oil chamber that is filled with hydraulic oil;

a stationary piston rod having a first end connected securely to said piston and a second end extending through said lower end of said cylinder body, said cylinder body being movable vertically relative to said stationary piston rod;

a first positioning member fitted in said cylinder body adjacent to said upper end of said cylinder body;

a second positioning member having an axial hole formed therein and being fitted in said cylinder body between said first positioning member and said piston, said piston and said second positioning member cooperatively confining a second volume-variable oil chamber that is filled with hydraulic oil, said first and second positioning members cooperatively confining a third oil chamber that is filled with hydraulic oil, said piston having an oil passage formed therethrough so as to communicate said first and second oil chambers;

a hollow tube extending axially in said third oil chamber and having an upper end connected securely to said first positioning member, and a lower end connected securely to said second positioning member, said tube being formed with a radial hole adjacent to said lower end thereof;

a flexible sleeve member surrounding an outer surface of said hollow tube so as to form a volume-variable receiving room that receives compressible nitrogen therein, said axial hole in said second positioning member and said radial hole in said tube intercommunicating said second oil chamber and said receiving room;

a movable shaft extending axially into said hollow tube and having an uppermost end and a lowermost end extending into said second oil chamber, said movable shaft defining a clearance with an inner wall surface of said tube;

a valve piece provided on said lowermost end of said shaft to selectively block said axial hole in said second positioning member so as to prevent vertical movement of said cylinder body relative to said piston rod;

a biasing means to bias said valve piece to block normally said axial hole; and an actuating means provided on said uppermost end of said movable shaft and operable so as to move said movable shaft downward against action of said biasing means to correspondingly remove said valve piece from said axial hole in order to permit vertical movement of said cylinder body relative to said piston rod.

* * * * *